(12) United States Patent
Ikeda et al.

(10) Patent No.: US 6,822,831 B2
(45) Date of Patent: Nov. 23, 2004

(54) MAGNETIC THIN FILM, MAGNETIC THIN FILM FORMING METHOD, AND RECORDING HEAD

(75) Inventors: Shoji Ikeda, Kawasaki (JP); Yuji Uehara, Kawasaki (JP); Ikuya Tagawa, Kawasaki (JP); Naoki Takeguchi, Kawasaki (JP); Masahiro Kakehi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 14 days.

(21) Appl. No.: 10/074,185

(22) Filed: Feb. 12, 2002

(65) Prior Publication Data

US 2002/0129875 A1 Sep. 19, 2002

Related U.S. Application Data

(63) Continuation of application No. PCT/JP99/06607, filed on Nov. 26, 1999.

(51) Int. Cl.$^7$ ............................................. G11B 5/147
(52) U.S. Cl. ..................... 360/126; 360/125; 148/306; 148/315; 428/900; 420/8; 420/117; 420/122; 420/123; 420/124; 420/126; 420/127; 420/83
(58) Field of Search ................................. 148/306, 315; 360/125, 126; 420/8, 117, 122, 123, 124, 126, 127, 83; 428/900

(56) References Cited

U.S. PATENT DOCUMENTS 6,188,543 B1 * 2/2001 Terunuma et al. .......... 360/126
6,224,719 B1 * 5/2001 Westwood ................ 204/192.2
6,477,018 B1 * 11/2002 Terunuma .................. 360/317

FOREIGN PATENT DOCUMENTS

| JP | 3-89505 | * | 4/1991 |
| JP | 3-116910 | * | 5/1991 |
| JP | 4-162505 | * | 6/1992 |
| JP | 7-86035 | | 3/1995 |
| JP | 7-86036 | | 3/1995 |
| JP | 9-115729 | | 5/1997 |

OTHER PUBLICATIONS

Callister, Willaim D., Materials Science and Engineering An Introduction, 1985, pp. 49 and 50.*

* cited by examiner

Primary Examiner—John P Sheehan
(74) Attorney, Agent, or Firm—Greer, Burns & Crain, Ltd.

(57) ABSTRACT

An object of the present invention is to provide a recording head having a magnetic pole simultaneously possessing a high saturation magnetic flux density, a high permeability and a high electric resistivity, and the magnetic pole of the recording head is a polycrystalline film comprising Fe whose content is not less than 57.5 atomic % and not more than 94.5 atomic %; one or more kinds of elements selected from the element group of Al, B, Ga, Si, Ge, Y, Ti, Zr, Hf, V, Nb, Ta, Cr, Mo, W and Rh, whose whole content is not less than 1 atomic % and not more than 15 atomic %; N whose content is not less than 0.5 atomic % and not more than 10 atomic %; and O whose content is not less than 1.5 atomic % and not more than 22.5 atomic %.

8 Claims, 9 Drawing Sheets

MAGNETIC THIN FILM, MAGNETIC THIN FILM FORMING METHOD, AND RECORDING HEAD

This is a continuation of International PCT Application No. PCT/JP99/06607 filed Nov. 26, 1999, which was not published in English.

TECHNICAL FIELD

The present invention relates to a magnetic thin film exhibiting soft magnetism, a recording head generating a magnetic field to magnetize an external medium, and a magnetic thin film forming method of forming the magnetic thin film.

BACKGROUND ART

In recent years, with the spread of computers, a large quantity of information has been daily dealt with, and as a device for recording such a large quantity of information, for example, a hard disk device (HDD: Hard Disk Drive) has been used. The HDD is provided with a magnetic disk as a recording medium a surface of which is made of a magnetic material, and a recording head having a fine coil and further a magnetic pole made of a soft magnetic material, magnetized by the coil, and transmitting a magnetic field generated from the coil, disposed near the above magnetic disk, wherein the surface of the magnetic disk is magnetized by each fine region (1-bit region) by the magnetic field transmitted through the magnetic pole, information is recorded as the direction of magnetization of the fine region.

The recording density of information recorded on a magnetic disk is increasing year by year, and it is known that the magnetic disk on which information is recorded at such an increased recording density must have a high coercive force. On the other hand, a recording head recording information on this magnetic disk must reverse each magnetization of the magnetic disk in which the coercive force has been thus enhanced. For this reason, in order to be able to generate a strong magnetic field, the magnetic pole of the recording head is required to be made of a material superior in soft magnetism (the permeability $\mu$ is high) and high in saturation magnetic flux density $B_s$.

Besides, attendant upon such an increase in recording density, a necessity in which the magnetic field is generated at a high recording frequency by the recording head arises. However, in such a high recording frequency, an eddy current arises on the magnetic pole of the recording head and soft magnetic characteristics such as the above permeability $\mu$ and magnetic flux density B deteriorate. To suppress this deterioration of soft magnetic characteristics, it suffices that the affection by the eddy current on the soft magnetic characteristics is suppressed by raising the electric resistivity $\rho$ of the magnetic pole. Since a permalloy plating film conventionally used as a magnetic pole material of the recording head has a low electric resistivity $\rho$ as about 20 $\mu\Omega$cm, to the recording head used at a recording frequency of 100 MHz of more, a magnetic pole material with a higher electric resistivity $\rho$ is required.

As a film having soft magnetism and having a high electric resistivity $\rho$, for example, an Fe—B—Al—O microcrystalline magnetic film is reported in Patent Application Laid-open No. 9-115729. Besides, in Patent Application Laid-open No. 7-86035 and Patent Application Laid-open No. 7-86036, microcrystalline magnetic films with high electric resistivities $\rho$ in which N is added in Fe—Al—O or the like have been proposed.

However, since any of these microcrystalline magnetic films has an organization of a structure in which a ceramics phase such as alumina having a low magnetic moment covers a microcrystalline phase having a high magnetic moment, although the electric resistivity $\rho$ is high, there is a problem that the saturation magnetic flux density $B_s$ and permeability $\mu$ are low, and so it is inferior in aptitude as a magnetic pole material for recording head.

DISCLOSURE OF THE INVENTION

In view of the above circumstances, the present invention aims to provide magnetic thin films and magnetic thin film forming methods simultaneously having a high saturation magnetic flux density $B_s$, a high permeability $\mu$, and a high electric resistivity $\rho$, and recording heads having a magnetic pole simultaneously having a high saturation magnetic flux density $B_s$, a high permeability $\mu$, and a high electric resistivity $\rho$.

A magnetic thin film of the present invention that achieves the above object is characterized by being a polycrystalline film comprising:

Fe whose content is not less than 57.5 atomic % and not more than 94.5 atomic %;

one or more kinds of elements selected from the element group of Al, B, Ga, Si, Ge, Y, Ti, Zr, Hf, V, Nb, Ta, Cr, Mo, W and Rh, whose whole content is not less than 1 atomic % and not more than 15 atomic %;

N whose content is not less than 0.5 atomic % and not more than 10 atomic %; and O whose content is not less than 1.5 atomic % and not more than 22.5 atomic %.

The polycrystalline film mentioned here means not one having an organization having a structure in which a ceramics phase covers a microcrystalline phase, like the above-described conventional magnetic thin films, but a polycrystalline film made up of crystal particles fundamentally having magnetism though permitting precipitation of substances to grain boundaries.

As will be described in detail in the below embodiment and examples, this magnetic thin film simultaneously has a high saturation magnetic flux density $B_s$, a high permeability $\mu$, and a high electric resistivity $\rho$. It is thinkable that this magnetic thin film has a high saturation magnetic flux density $B_s$ and a high permeability $\mu$ because this magnetic thin film has a characteristic in composition that the content of Fe is high in comparison with the above-described conventional magnetic thin films, and includes no ceramics phase or even if includes, the quantity of ceramics phase is a little. Besides, it is thinkable that since this magnetic thin film is such a polycrystalline film as described above and crystal particles are that in accordance with the above-described contents, to Fe, one or more kinds of elements selected from the above element group, O, and N are solid-solved, even if not being covered with a ceramics phase, it has a high electric resistivity $\rho$.

As will be described in the below examples, the magnetic thin film of the above present invention is preferable in which the saturation magnetic flux density $B_s$ is not less than 1.6 T and the electric resistivity $\rho$ is not less than 30 $\mu\Omega$cm. Besides, this magnetic thin film is preferable in which the permeability $\mu$ is not less than 500.

The magnetic thin film of the above present invention is preferably a polycrystalline film made up of crystal particles whose mean particle diameter is not more than 15 nm.

As will be described in the below embodiment and examples, in the magnetic thin film in which the saturation magnetic flux density $B_s$ is not less than 1.6 T, the electric resistivity ρ is not less than 30 μΩcm, and further the permeability μ is not less than 500, the mean particle diameter of crystal particles is actually not more than 15 nm. It is thinkable that the characteristic in organization of being made up of crystal particles of such small particle diameter is also effective for improvements of the above saturation magnetic flux density $B_s$, electric resistivity ρ, and permeability μ. For example, it is thinkable that by the particle diameter of crystal particles decreasing, the effective magnetic anisotropy $H_{eff}$ decreases, and with this decrease in effective magnetic anisotropy $H_{eff}$, the permeability μ increases.

A recording head of the present invention that achieves the above object is a recording head which has a coil generating a predetermined magnetic field and a soft magnetic member magnetized by the magnetic field generated from the coil and which magnetizes an external medium by the magnetic field generated by the coil and transmitted by the soft magnetic member, characterized in that the above soft magnetic member is a polycrystalline film comprising:

Fe whose content is not less than 57.5 atomic % and not more than 94.5 atomic %;

one or more kinds of elements selected from the element group of Al, B, Ga, Si, Ge, Y, Ti, Zr, Hf, V, Nb, Ta, Cr, Mo, W and Rh, whose whole content is not less than 1 atomic % and not more than 15 atomic %;

N whose content is not less than 0.5 atomic % and not more than 10 atomic %; and O whose content is not less than 1.5 atomic % and not more than 22.5 atomic %.

Since the soft magnetic member of this recording head is the same as the above-described magnetic thin film of the present invention, this soft magnetic member takes the same operation/effect of the above-described magnetic thin film of the present invention.

Since this soft magnetic member simultaneously has a high saturation magnetic flux density $B_s$, a high permeability μ, and a high electric resistivity ρ, the recording head using this soft magnetic member can generate a strong magnetic field at a high recording frequency and record information on a recording medium such as a magnetic disk at a high recording density.

In the recording head of the above present invention, the above soft magnetic member is preferably a polycrystalline film made up of crystal particles whose mean particle diameter is not more than 15 nm.

Since the soft magnetic member of this recording head is the same as the above-described magnetic thin film that is a polycrystalline film made up of crystal particles whose mean particle diameter is not more than 15 nm, this soft magnetic member takes the same operation/effect of this magnetic thin film.

A magnetic thin film forming method of the present invention that achieves the above object is a magnetic thin film forming method that forms a magnetic thin film comprising Fe, one or more kinds of elements selected from the element group of Al, B, Ga, Si, Ge, Y, Ti, Zr, Hf, V, Nb, Ta, Cr, Mo, W and Rh, N, and O, on a predetermined substrate by a sputtering process, characterized in that in order that the content of Fe in the above magnetic thin film may be not less than 57.5 atomic % and not more than 94.5 atomic %, the whole content of one or more kinds of elements selected from the above element group, in the above magnetic thin film, may be not less than 1 atomic % and not more than 15 atomic %, the content of N in the above magnetic thin film may be not less than 0.5 atomic % and not more than 10 atomic %, and further the content of O in the above magnetic thin film may be not less than 1.5 atomic % and not more than 22.5 atomic %, the magnetic thin film is formed, while controlling the quantities and ratios of materials composing a target, the flow rate and gas mixture ratio of sputter gas, and the electric power applied to the target.

As will be described in detail in the below embodiment and examples, the magnetic thin film formed by this magnetic thin film forming method simultaneously has a high saturation magnetic flux density $B_s$, a high permeability μ and a high electric resistivity ρ.

In the magnetic thin film forming method of the above present invention, during the formation of the magnetic thin film on the above substrate and after the film formation, the temperature of the above substrate is preferably maintained at 200° C. or less.

The magnetic thin film formed with keeping the temperature of the substrate 200° C. or less according to this magnetic thin film forming method has a high electric resistivity ρ and good soft magnetic characteristics and, for example, as will be described later in detail in examples, has a high saturation magnetic flux density $B_s$.

Besides, in case that the magnetic thin film formed by this magnetic thin film forming method is used as a soft magnetic material for a magnetic pole of a composite-type magnetic head made up of a recording head and a reproducing head, since the substrate temperature upon formation of this magnetic thin film is low as 200° C. or less, the reproducing head is kept in a desirable state without detracting the reproduction characteristics.

As described above, according to the present invention, there are provided a magnetic thin film simultaneously having a high saturation magnetic flux density, a high permeability and a high electric resistivity as well as a method of forming the magnetic thin film, and a recording head having a magnetic pole simultaneously possessing a high saturation magnetic flux density, a high permeability, and a high electric resistivity.

BEST MODE FOR CARRYING OUT THE INVENTION

Hereinafter, an embodiment of the present invention will be described.

Figure 1:
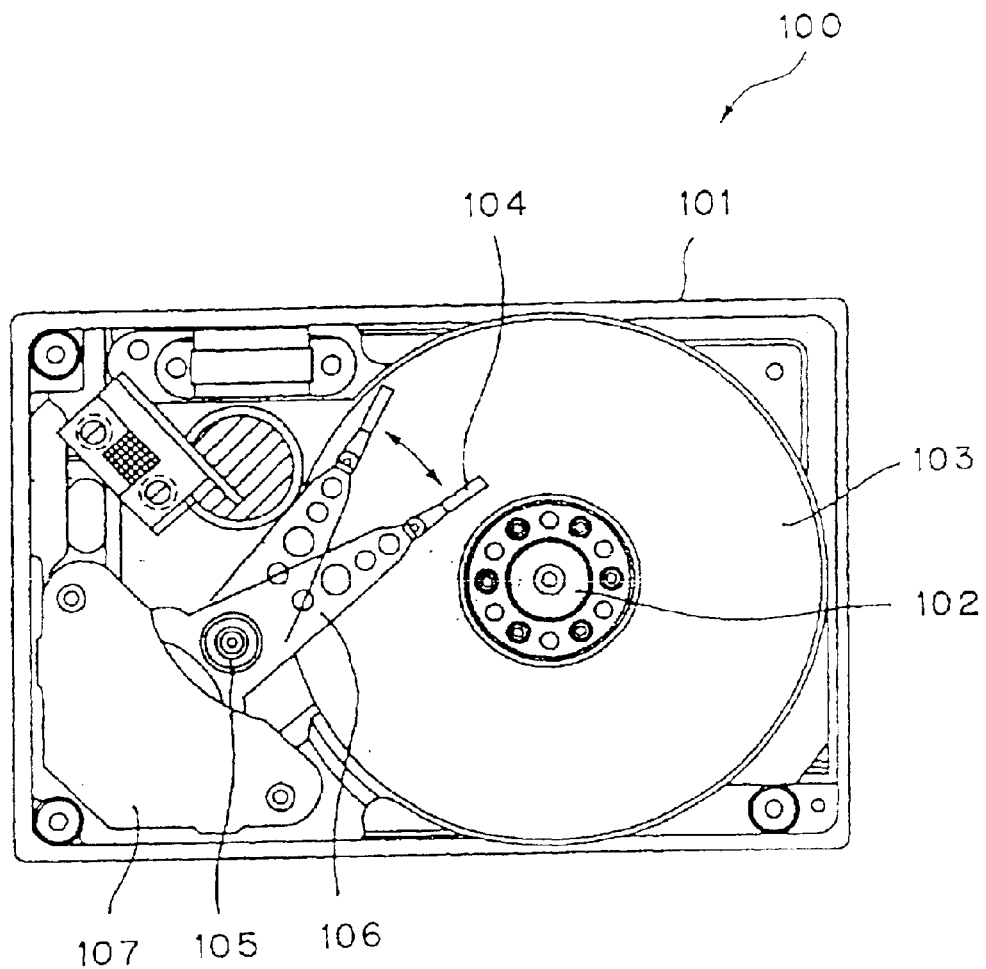
FIG. 1 is a view showing the internal construction of a hard disk device of this embodiment.

FIG. 1 is a view showing the internal construction of a hard disk device of this embodiment.

In a housing 101 of the hard disk device (HDD) 100 shown in the same figure, a rotational axis 102, a magnetic disk 103 attached to the rotational axis 102, a floating head slider 104 opposite to the magnetic disk 103, an arm shaft 105, a carriage arm 106 the distal end of which the floating head slider 104 adheres and which moves horizontally over the magnetic disk 103 around the arm shaft 105, and an actuator 107 driving the horizontal movement of the carriage arm 106 are accommodated. Upon reproduction of information recorded on the magnetic disk 103, the carriage arm 106 is driven by the actuator 107 constituted by a magnetic circuit, and the floating head slider 104 is positioned to a desired track on the rotating magnetic disk 103. On the floating head slider 104, a composite-type magnetic head made up of a reproducing head and a recording head, not shown in FIG. 1, is disposed. With the rotation of the magnetic disk 103, this composite-type magnetic head gets near, in order, to 1-bit regions arranged in each track of the magnetic disk 103. The composite-type magnetic head having thus got near to the magnetic disk 103 applies a magnetic field to those 1-bit regions through the recording head and records information as a magnetization direction of each 1-bit region. Besides, through the reproducing head, it takes out those pieces of information by electric reproduction signals generated in accordance with magnetic fields generated from the respective magnetizations of those 1-bit regions. The internal space of the housing 101 is closed by a not-shown cover.

Figure 2:
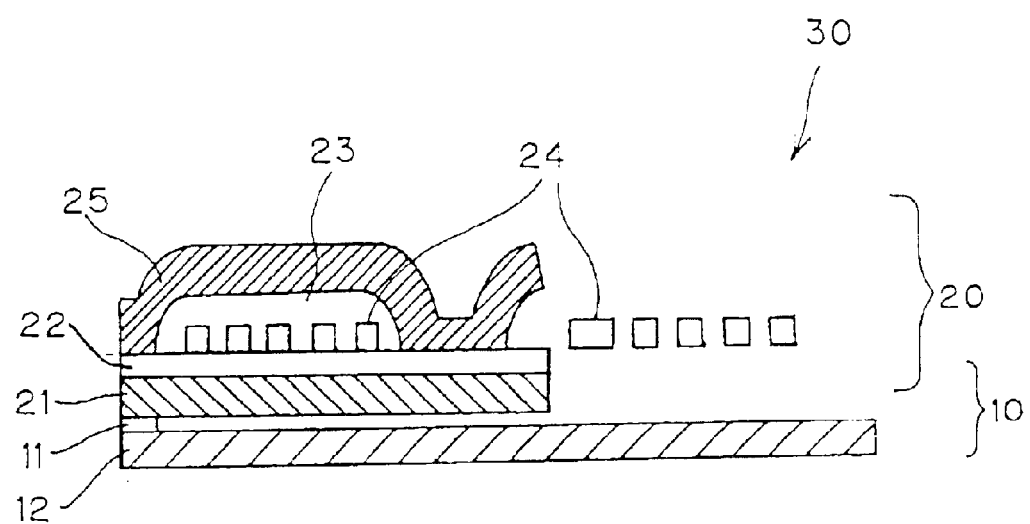
FIG. 2 is a side sectional view of a composite-type magnetic head used in the hard disk device of this embodiment.
Figure 3:
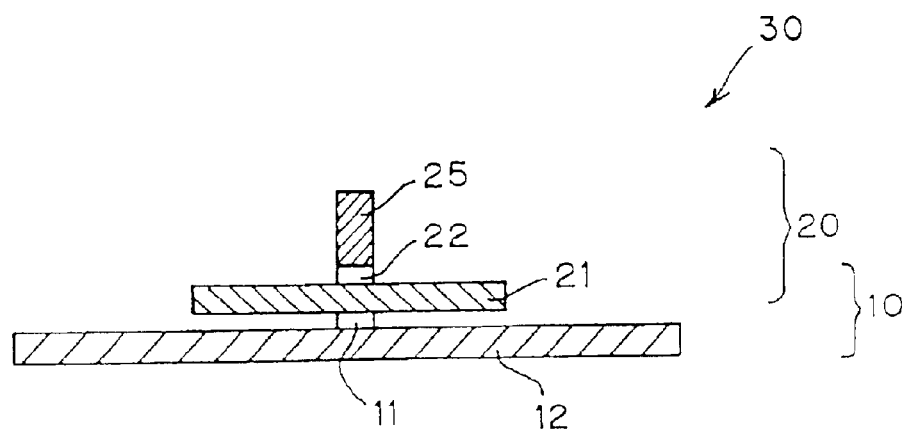
FIG. 3 is a front view of the composite-type magnetic head used in the hard disk device of this embodiment.

FIG. 2 is a side sectional view of the composite-type magnetic head used in the hard disk device of this embodiment, and FIG. 3 is a front view of the composite-type magnetic head used in the hard disk device of this embodiment.

In the above hard disk device 100, the composite-type magnetic head 30 shown in FIGS. 2 and 3 is positioned near the magnetic disk 103 not shown in FIGS. 2 and 3. In FIG. 2, the composite-type magnetic head 30 faces the magnetic disk 103 on the left side of the same figure, and in FIG. 3, the composite-type magnetic head 30 faces the magnetic disk 103 in front of the same figure.

In FIGS. 2 and 3, the composite-type magnetic head 30 is generally made up of a reproducing head 10 and a recording head 20, and this composite-type magnetic head 30 takes a structure in which the recording head 20 is added to the back portion of the reproducing head 10.

As shown in these figures, the reproducing head 10 has an element portion 11 that includes, e.g., a magnetoresistance effect element, electrodes, etc., and receives a magnetic field from the magnetic disk 103 to generate a reproduction signal in accordance with the magnetic field, and a reproduction lower shield 12 and a reproduction upper shield 21 made of a soft magnetic material and disposed so as to sandwich this element portion 11 from both sides in a film thickness direction of this element portion 11.

On the other hand, the recording head 20 has a recording lower magnetic pole 21 that serves also as the reproduction upper shield 21 of the reproducing head 10, a recording gap film 22 made of, e.g., 0.4 $\mu$m-thick $Al_2O_3$ is formed on the recording lower magnetic pole 21, a recording coil 24 made of, e.g., Cu and an organic insulating layer 23 such as a resist surrounding the periphery of this recording coil 24 are formed on the recording gap film 22, and further a recording upper magnetic pole 25 made of a soft magnetic material is formed on these recording gap film 22 and organic insulating layer 23. This recording upper magnetic pole 25 is formed so as to be laminated at the portion facing the magnetic disk 103 and the central portion of the recording coil 24 near the middle of the same figure on the recording gap film 22 and at the portion other than those on the organic insulating layer 23 covering the recording coil 24. These recording lower magnetic pole 21 and recording upper magnetic pole 25 both correspond to the soft magnetic member mentioned in the recording head of the present invention and also to the magnetic thin film of the present invention. In the recording upper magnetic pole 25 and the recording gap film 22, as shown in FIG. 3, as a core width, viewing from a face of the magnetic disk 103, the portion facing the face is narrowed to, e.g., about 1 $\mu$m in a direction that the above recording gap film 22 spreads. Incidentally, the above-described element portion 11 is also narrowed to about 1 $\mu$m in the portion facing this face.

As shown in FIG. 2, the recording upper magnetic pole 25 and the recording lower magnetic pole 21 form a magnetic circuit extending around the recording coil 24 through the central portion of the recording coil 24. while magnetizing the above recording upper magnetic pole 25 and the above recording lower magnetic pole 21, a magnetic field generated from this recording coil 24 is transmitted in these magnetic poles and externally introduced through the portion, facing the above magnetic disk 103, where the above recording lower magnetic pole 21 and the above recording upper magnetic pole 25 sandwich the above recording gap film 22 to be distant at a fine interval. By this externally introduced magnetic field, the direction of magnetization of each 1-bit region of the above-described magnetic disk 103 is changed.

Next, a magnetic thin film used as these recording lower magnetic pole 21 and recording upper magnetic pole 25 and a forming method of this magnetic thin film will be described.

Figure 4:
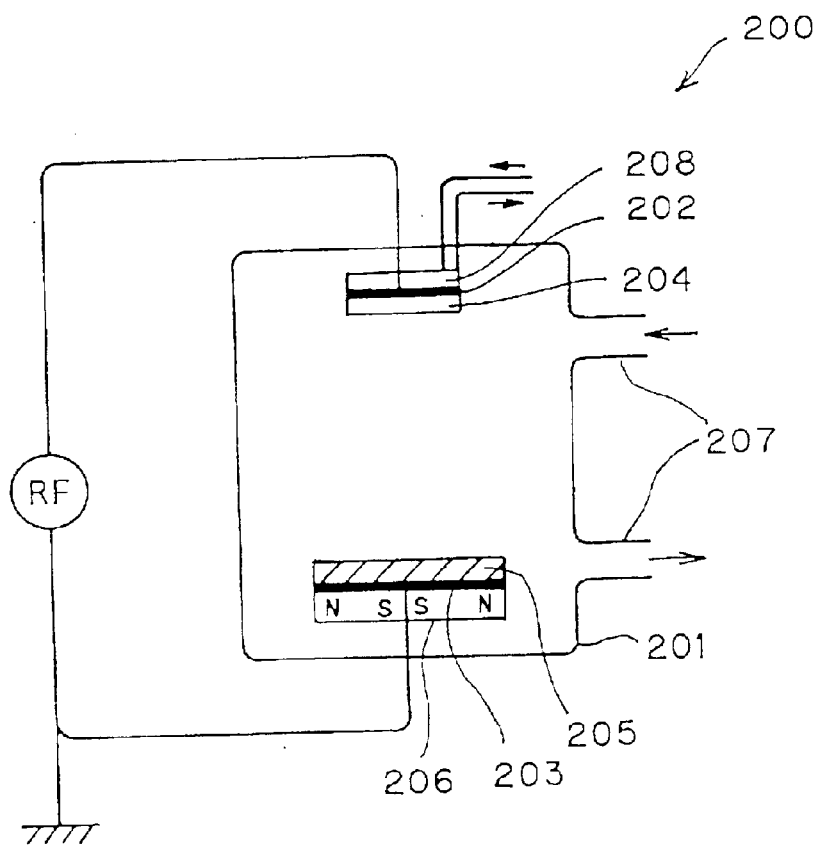
FIG. 4 is a schematic view of an RF magnetron sputter apparatus forming a magnetic thin film according to the present invention.

FIG. 4 is a schematic view of an RF magnetron sputter apparatus forming a magnetic thin film according to the present invention.

The sputter apparatus 200 shown in the same figure has a vacuum vessel 201 and in the interior of the vacuum vessel 201, has two electrodes 202 and 203 to which a high-frequency alternating voltage is applied. On one electrode 202 of those electrodes, a substrate 204 is disposed and on the other electrode 203, a target 205 made of various materials as will be described later is disposed. Besides, on the electrode 203 on this target 205 side, a magnet 206 is disposed. This vacuum vessel 201 connects with a gas pipe 207 through which gas flows in/out and through this gas pipe 207, gas is introduced. Besides, in the electrode 202 on which the substrate 204 is disposed, a cooler 208 capable of water cooling is provided and by this cooler 208, the temperature of the substrate 204 is regulated to 200° C. or less.

When a high-frequency alternating voltage is applied to the above electrodes 202 and 203, gas in the vacuum vessel 201 is put in a plasma state, the gas thus put in the plasma state is accelerated with the course being curved by a magnetic field by the magnet 206 and strikes the target 205, and atoms of the material composing the target 205 are sprung out. These atoms adhere to the substrate 204 and react with an active gas component (reactive sputter gas) of the gas components so that a thin film is formed on the substrate 204.

Upon formation of this thin film, as combinations of the target 205 and the gas introduced in the vacuum vessel 201, for example, the following five can be mentioned.

1. A combination in which, as the target 205, a composite target in which an oxide chip made up of one or more kinds of elements M selected from the element group of Al, B, Ga, Si, Ge, Y, Ti, Zr, Hf, V, Nb, Ta, Cr, Mo, W and Rh, and O is disposed on or buried in an Fe target, or an alloy target in which oxide powder made up of one or more kinds of elements M selected from the element group and O and Fe powder are sintered and molded, is used and gas containing N is introduced in the vacuum vessel 201. In the examples as will be described later, thin films were formed in this combination.

2. A combination in which, as the target 205, a composite target in which a nitride chip made up of one or more kinds of elements M selected from the above element group and N is disposed on or buried in an Fe target, or an alloy target in which nitride powder made up of one or more kinds of elements M selected from the element group and N and Fe powder are sintered and molded, is used and gas containing O is introduced in the vacuum vessel 201.

3. A combination in which, as the target 205, a target of oxide made up of one or more kinds of elements M selected from the above element group and O and an Fe target are used at once and gas containing N is introduced in the vacuum vessel 201.

4. A combination in which, as the target 205, a target of nitride made up of one or more kinds of elements M selected from the above element group and N and an Fe target are used at once and gas containing O is introduced in the vacuum vessel 201. In the above combinations 1 to 4, by using oxide or nitride as a constituent substance of the target, only the flow rate of any one of oxygen or nitrogen used as reactive sputter gas may be controlled.

5. A combination in which, as the target 205, targets containing one or more kinds of elements M selected from the above element group and Fe are used at once and gas containing O and N is introduced in the vacuum vessel 201.

In each case of those combinations, on the substrate 204 there is formed an Fe—N—M—O film made up of Fe and N, one or more kinds of elements M selected from the above element group, and O. As will be shown later in examples, in case of having a composition in which, in this film, the content of Fe is not less than 57.5 atomic % and not more than 94.5 atomic %, the whole content of one or more kinds of elements M selected from the above element group is not less than 1 atomic % and not more than 15 atomic %, the content of N is not less than 0.5 atomic % and not more than 10 atomic %, and the content of O is not less than 1.5 atomic % and not more than 22.5 atomic %, this film is a polycrystalline film and no ceramics network is observed in the organization. Besides, in case of a polycrystalline film having the above composition, this film has desired characteristics as a saturation magnetic flux density $B_s$ of 1.6 T or more, a permeability $\mu$ of 500 or more, and an electric resistivity $\rho$ of 30 $\mu\Omega$cm or more. The mean particle diameter of crystal particles of the Fe—N—M—O film having these desired characteristics is a small value as 15 nm or less as shown in examples and the mean particle diameter of crystal particles of this film is preferably 15 nm or less. Besides, the mean particle diameter of crystal particles of an Fe—N—M—O film exhibiting high values in which these characteristics have been improved more is a small value as 5 nm or less as shown in examples and the mean particle diameter of crystal particles of this film is more preferably 5 nm or less.

As the reason why this Fe—N—M—O film exhibits high values in saturation magnetic flux density $B_s$, electric resistivity $\rho$, and permeability $\mu$ as described above, first, an increase in saturation magnetic flux density $B_s$ due to a height of the Fe concentration in the composition of the film, an increase in electric resistivity $\rho$ because elements such as elements of the above element group, N, and O are solid-solved in a crystal particle even if the crystal particle is not covered with a ceramics network, an increase in permeability $\mu$ because the crystal particle is fine as 15 nm or less, in some case, 5 nm or less, and so on are thinkable.

Since the above recording lower magnetic pole 21 and recording upper magnetic pole 25 are made of such an Fe—N—M—O film and have the above-described characteristics, they are suitable as a magnetic material of a recording head for high-frequency recording.

Besides, since this film can be obtained immediately after being formed through a low-temperature forming process at 200° C. or less, in case of being used as the recording lower magnetic pole 21 and the recording upper magnetic pole 25 of the above composite-type head 30, it never deteriorates the element portion 12 of the reproducing head 10 due to the formation of this film. Besides, it is thinkable that the film has a desirable organization as described above by such a low-temperature forming process, and the above-described characteristics are improved.

Besides, in not only a single layer film of an Fe—N—M—O film but also a multilayer film in which a plurality of layers of an Fe—N—M—O layer and an insulating layer or a magnetic layer are laminated, like a case of a single layer film, it exhibits high values in saturation magnetic flux density $B_s$, electric resistivity $\rho$, and permeability $\mu$.

Note that although, in this embodiment, as described above, the magnetic thin film simultaneously having a high saturation magnetic flux density $B_s$, a high permeability $\mu$, and a high electric resistivity $\rho$ is used as a magnetic pole material of a recording head of an HDD, the application of the magnetic thin film of the present invention is not limited to this and it is effectively used in case of having need of good soft magnetism with a high-frequency magnetic field variation.

EXAMPLE

Hereinafter, examples of magnetic thin film of the present invention and magnetic thin film forming method of the present invention will be described.

In this example, using the above-described sputter apparatus 200 of RF magnetron system, to the target 205, sputter was performed at an applied power of 3.1 W per 1 cm² of the surface of the target 205 and a sputter pressure of 0.5 Pa. A thin film was formed under conditions that as the target 205, a composite target in which an alumina ($Al_2O_3$) chip of a size of 10 mm×10 mm was disposed on a 20 cm-diameter Fe target was used, a glass substrate was adopted as the substrate 204, and mixture gas of $N_2$ and Ar is introduced into the vacuum vessel 201. Note that, in this example, without annealing the thin film formed on the substrate 204, the formation of the thin films was completed at the time of the formation by the sputter apparatus 200.

The contents of Al and O in the thin film were controlled by varying the number of alumina chips as described above from 0 to 50. As the number of chips is increased, the contents of Al and O in the film increase. Control of the N content in the film was performed by introducing mixture gas constituted by $N_2$ gas and Ar gas into the vacuum vessel 201 in addition to Ar gas of a flow rate of 50 cm³/s (50 sccm). Note that, in this mixture gas constituted by $N_2$ gas and Ar gas, the flow rate is varied from 0 cm³/s to 10 cm³/s with keeping the volume mixture ratio at a ratio of 1 of $N_2$ gas to 4 of Ar gas. After this, a case of calling the flow rate of mixture gas indicates the flow rate of mixture gas thus varying from 0 cm³/s to 10 cm³/s.

To thin films formed as described above, various experiments were performed. The experimental results will be shown below. Incidentally, in these experiments, observation of crystal organization was performed by TEM images photographed with a transmission-type electron microscope (TEM: NIHON DENSHI JEM-2000EX) and X-ray diffraction patterns of thin films were measured with an X-ray diffraction apparatus (XRD: Rigaku Corporation RINT-1000). Besides, for measurement of magnetic characteristics, a sample oscillation type magnetometer (VSM: Digital Measurement systems Model 1660) and a B-H loop tracer (RIKEN DENSHI B-H curve tracer) were used and measurement of permeability $\mu$ was performed by a parallel line method with a high-frequency permeability measuring apparatus (Hayama Inc. MP-2000). Besides, electric resistivity $\rho$ was measured by a direct-current four-terminal method and composition analysis of thin films was performed with an energy dispersion type X-ray analyzer (EDX: HORIBA, Ltd. EMAX-5770W) and an electron probe micro analyzer (EPMA: NIHON DENSHI JXA-6900).

<TEM Image and XRD Pattern>

A TEM image of an Fe—N—Al—O film formed when the number of alumina chips as described above was 30 and the flow rate of the above mixture gas was 4.5 cm³/s was photographed.

Figure 5:
FIG. 5 is a view showing a transmission microscope image of an Fe—N—Al—O film.

FIG. 5 is a view showing a transmission microscope (TEM) image of the Fe—N—Al—O film.

In this TEM image, an individual small black particle indicates one crystal particle. Comparing with a scale of 20 nm displayed in the lower portion of the same figure, it is found that this film takes a nanocrystal structure in which the mean crystal particle diameter of crystal particles is 5 nm or less. Note that a black particle-like portion in the same figure indicates a crystal particle having a crystal orientation satisfying diffraction conditions of an electron beam. Besides, it is thinkable that a white ground portion in the same figure indicates a crystal particle having a crystal orientation not satisfying diffraction conditions of the electron beam.

Figure 6:
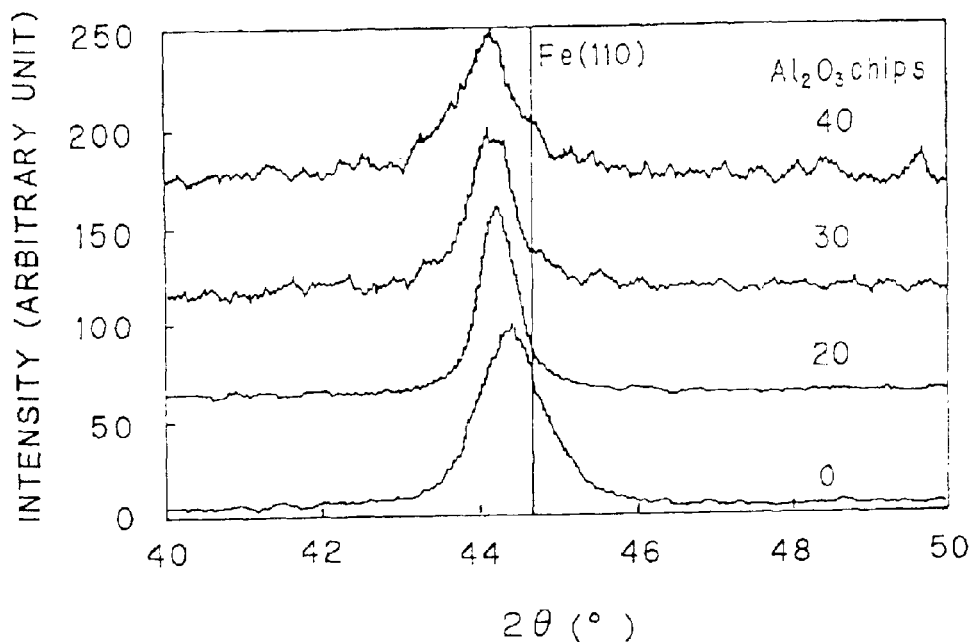
FIG. 6 is a view showing an X-ray diffraction pattern of an Fe—N—Al—O film.

Besides, to Fe—N—Al—O films formed when the flow rate of the above mixture gas was fixed to 4.5 cm³/s and the number of alumina chips as described above was from 0 to 40 (Fe—N film in case of 0), measurement of X-ray diffraction pattern was performed. A result of this measurement is shown in FIG. 6. Besides, to Fe—N—Al—O films formed when the number of alumina chips as described above was fixed to 30 and the flow rate of the above mixture gas was from 0 cm³/s to 5 cm³/s (Fe—Al—O film in case of 0 cm³/s), measurement of X-ray diffraction pattern was performed. A result of this measurement is shown in FIG. 7.

Figure 7:
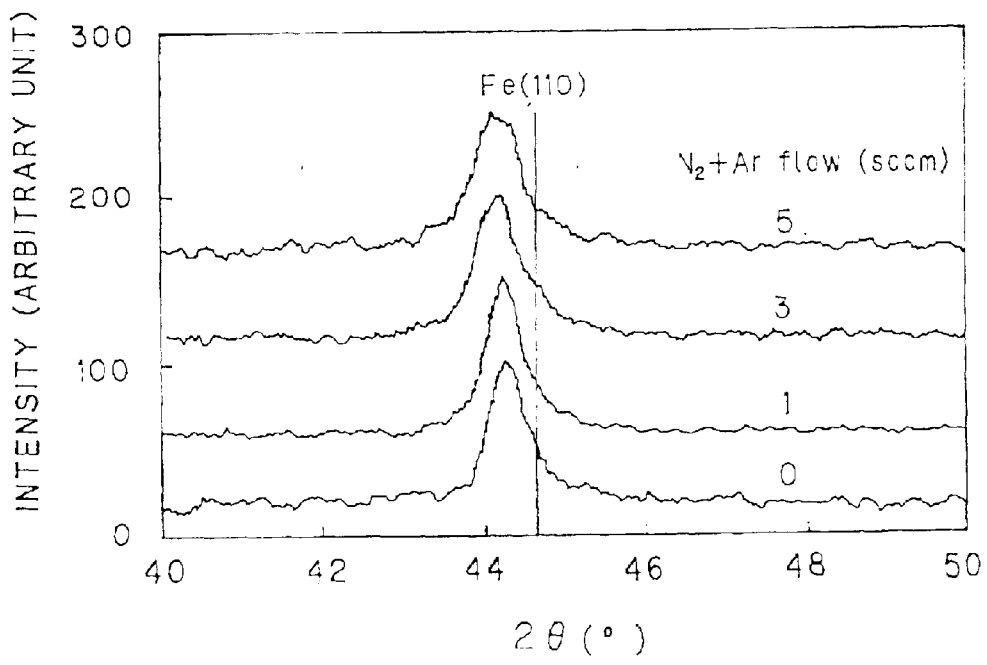
FIG. 7 is a view showing an X-ray diffraction pattern of an Fe—N—Al—O film.

FIGS. 6 and 7 are views showing X-ray diffraction (XRD) patterns of Fe—N—Al—O films.

The axis of abscissas of either of FIGS. 6 and 7 represents X-ray diffraction angle 2θ and the axis of ordinates of either of FIGS. 6 and 7 represents X-ray diffraction intensity. Either figure shows an X-ray diffraction pattern near the X-ray diffraction angle corresponding to Fe (110) of α-Fe (bcc-Fe) phase.

As shown in FIG. 6, as the number of alumina chips disposed on the Fe target upon film formation was increased as 20, 30, and 40, the peak of the X-ray diffraction pattern corresponding to α-Fe (110) phase of Fe—N—Al—O film shifted to the low angle side. Besides, as shown in FIG. 7, as the flow rate of the above mixture gas upon film formation was increased as 1, 3, and 5 cm³/s, the peak of the X-ray diffraction pattern corresponding to α-Fe (110) phase of Fe—N—Al—O film shifted to the low angle side. From these measurement results of X-ray diffraction pattern, it is found that Al, O, and N have been solid-solved in α-Fe phase.

Incidentally, in the X-ray diffraction patterns of the Fe—N—Al—O films, no peak representing ceramics phase such as $Al_2O_3$ was observed. Besides, from the state of the above TEM image and the results of this measurement of X-ray diffraction pattern, it is thinkable that the Fe—N—Al—O film is a polycrystalline film in which crystals basically made of Fe—N—Al—O have gathered and crystal particles of this film is not in a state of being covered with ceramics phase such as $Al_2O_3$. From the half value widths of peaks of α-Fe solid solution phase (110) in the above various X-ray diffraction patterns, the particle diameter of each crystal particle of this polycrystalline film was judged to be 15 nm or less.

Synthesizing the above-described results, it is found that the Fe—N—Al—O film formed by this example is a polycrystalline film in which Al, O, and N have been solid-solved in α-Fe phase and which is composed of crystal particles whose mean particle diameter is 15 nm or less.

<M-H Curve>

Figure 8:
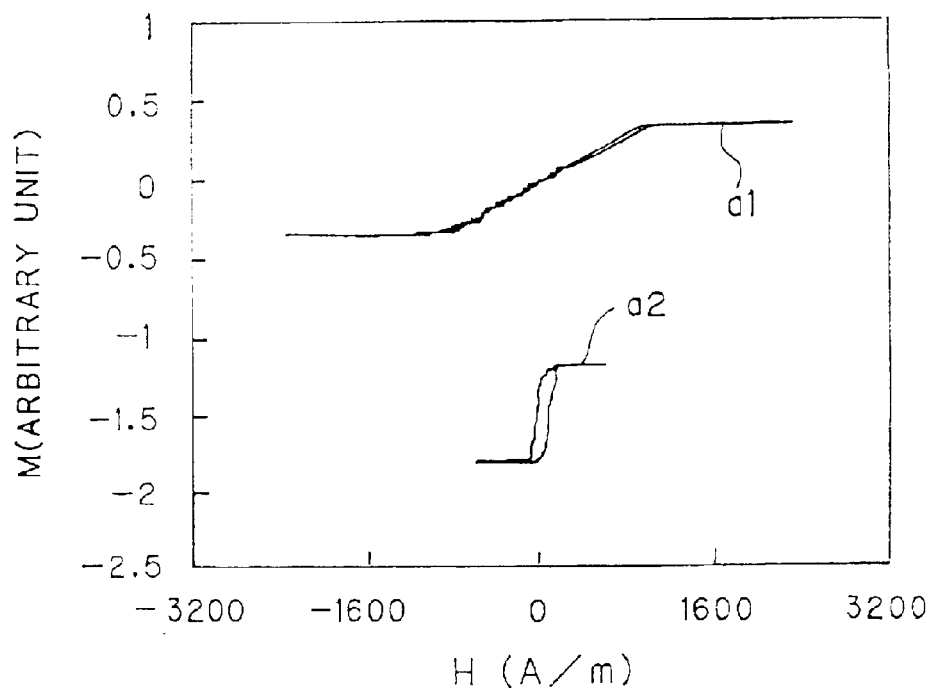
FIG. 8 is a graph showing M-H curves of an Fe—N—Al—O film.

FIG. 8 is a graph showing M-H curves of an Fe—N—Al—O film.

In the same figure, M-H curves of an Fe—N—Al—O film formed on a water-cooled substrate when 30 alumina chips were disposed on the above target 205 and the flow rate of the mixture gas was 4.5 cm³/s are shown. The axis of abscissas of the same figure represents magnetic field H applied to the Fe—N—Al—O film and the axis of ordinates represents magnetization M of the film. This film has one-axis magnetic anisotropy and in the same figure, two kinds of M-H curves are shown. One of the two kinds of M-H curves is an M-H curve a1 in case that the magnetic field H is applied in a magnetization hard axis direction of the film, and in the M-H curve, the coercive force $H_{ch}$ in the magnetization hard axis direction is about 20 A/m and till the magnetic field H increases and reaches 1000 A/m, the magnetization M monotonously increases and then it is saturated. From this M-H curve, it is found that this Fe—N—Al—O film is a good soft magnetic substance in which the anisotropic magnetic field $H_k$ is about 1000 A/m and the permeability $\mu$ in the magnetization hard axis direction is high as about 2000. In general, the magnetization hard axis direction of a magnetic pole of a recording head faces the direction of a magnetic field generated from a recording coil and passing through the magnetic pole, and since the direction of magnetization of the magnetic pole changes in accordance with the direction of the magnetic field, the permeability $\mu$ of the magnetic pole of the recording head is represented by the permeability $\mu$ in the magnetization hard axis direction of the magnetic pole. Hereinafter, the permeability $\mu$ in the magnetization hard axis direction will be simply mentioned as the permeability $\mu$. Besides, although the permeability $\mu$ and the anisotropic magnetic field $H_k$ of the magnetic pole of the recording head are generally determined by the permeability $\mu$ and the anisotropic magnetic field $H_k$ specific to the material of this magnetic pole, respectively, they change also in accordance with shape of the magnetic pole or the like.

The other M-H curve a2 is an M-H curve in case that the magnetic field H is applied in a magnetization easy axis direction of the Fe—N—Al—O film, and from the M-H curve, it is found that the coercive force $H_{ce}$ in the magnetization easy axis direction of this film is 80 A/m or less.

<Substrate Temperature $T_s$>

Figure 9:
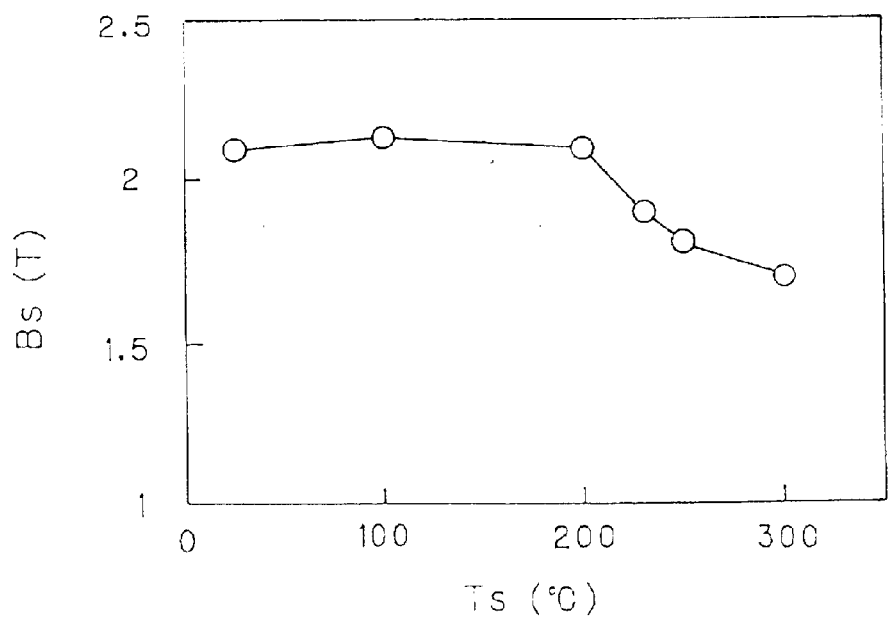
FIG. 9 is a graph showing an change in saturation magnetic flux density $B_s$ of Fe—N—Al—O films formed with varying the substrate temperature $T_s$.

FIG. 9 is a graph showing an change in saturation magnetic flux density $B_s$ of Fe—N—Al—O films formed with varying the substrate temperature $T_s$.

In the same figure, measurement results of saturation magnetic flux density $B_s$ of Fe—N—Al—O films formed under various substrate temperatures $T_s$. This film was formed under conditions that 20 alumina chips were disposed on the target 205 and the flow rate of the mixture gas was 4.5 cm$^3$/s. The axis of abscissas of FIG. 9 represents the substrate temperature $T_s$ of the substrate 204 and the axis of ordinates represents the saturation magnetic flux density $B_s$ of the Fe—N—Al—O film formed on the substrate 204. In the same figure, a white circle indicates a measurement result actually measured and a solid line indicates a result in which these measurement values have been interpolated.

The saturation magnetic flux density $B_s$ exhibited a substantially constant value exceeding 2T at substrate temperatures $T_s$ of 200° C. or less, monotonously decreased at substrate temperatures $T_s$ of 200° C. or more, and reached 1.7 T at a substrate temperature $T_s$ of 300° C. Besides, although not shown in the figure, in correspondence with this decrease in saturation magnetic flux density $B_s$, in substrate temperatures $T_s$ of 250° C. or more, the resistivity $\rho$ of the film decreased and deterioration of soft magnetism was also observed.

<Saturation Magnetic Flux Density $B_s$, Electric Resistivity $\rho$, and Permeability $\mu$>

Figure 10:
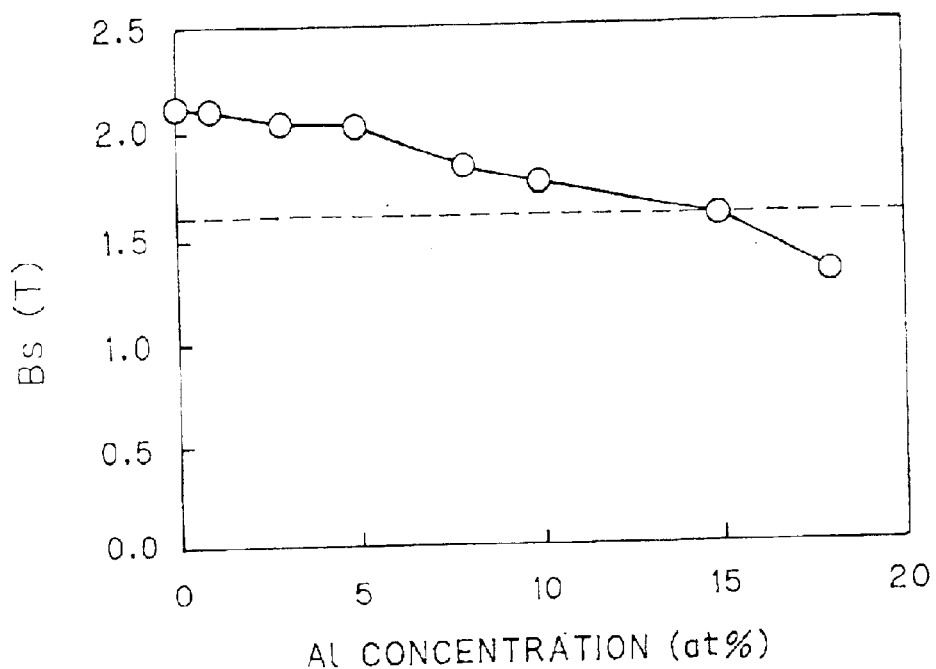
FIG. 10 is a graph showing Al-concentration dependence of saturation magnetic flux density $B_s$ of Fe—N—Al—O films.
Figure 11:
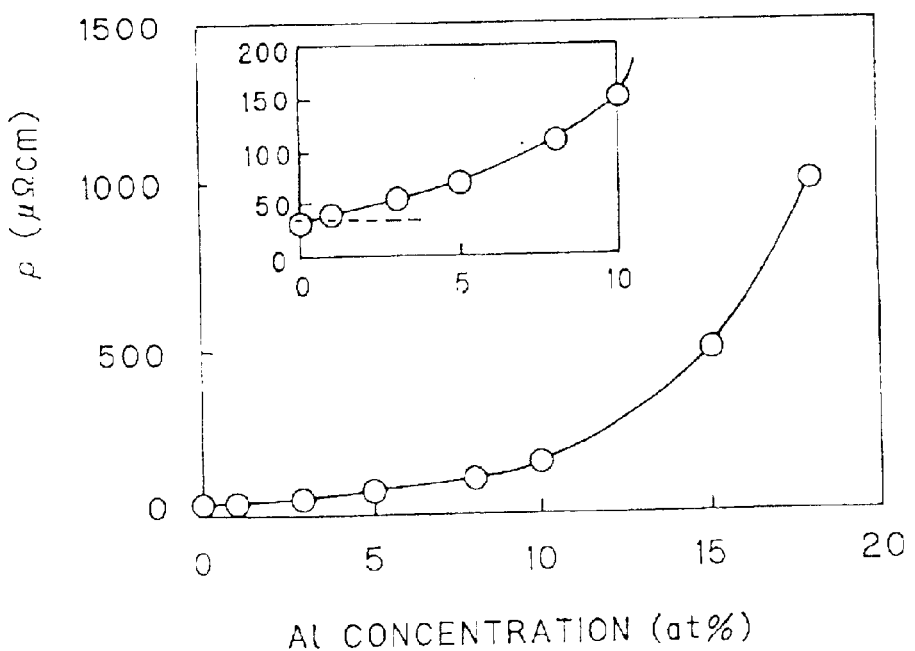
FIG. 11 is a graph showing Al-concentration dependence of electric resistivity $\rho$ of Fe—N—Al—O films.
Figure 12:
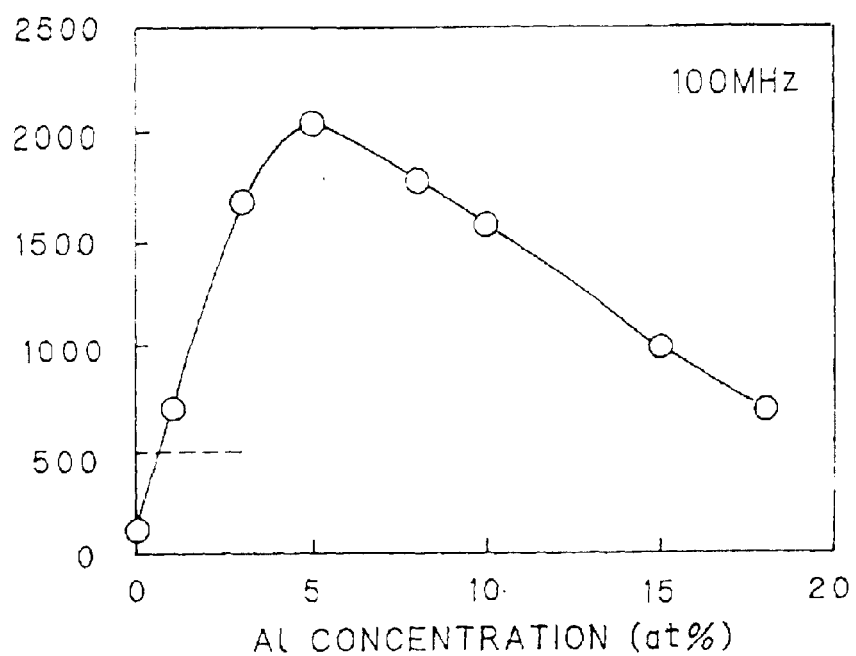
FIG. 12 is a graph showing Al-concentration dependence of permeability $\mu$ of Fe—N—Al—O films.

FIG. 10 is a graph showing Al-concentration dependence of saturation magnetic flux density $B_s$ of Fe—N—Al—O films, FIG. 11 is a graph showing Al-concentration dependence of electric resistivity $\rho$ of Fe—N—Al—O films, and FIG. 12 is a graph showing Al-concentration dependence of permeability $\mu$ of Fe—N—Al—O films. Besides, FIG. 13 is a graph showing N-concentration dependence of saturation magnetic flux density $B_s$ of Fe—N—Al—O films, FIG. 14 is a graph showing N-concentration dependence of electric resistivity $\rho$ of Fe—N—Al—O films, and FIG. 15 is a graph showing N-concentration dependence of permeability $\mu$ of Fe—N—Al—O films.

In FIGS. 10, 11, and 12, Fe—N—Al—O films having Al concentrations of from 0 atomic % to 18 atomic % by varying the number of alumina chips disposed on the target 205 from 0 to 50 with fixing the flow rate of the mixture gas to 4.5 cm$^3$/s, are measurement targets.

Figure 13:
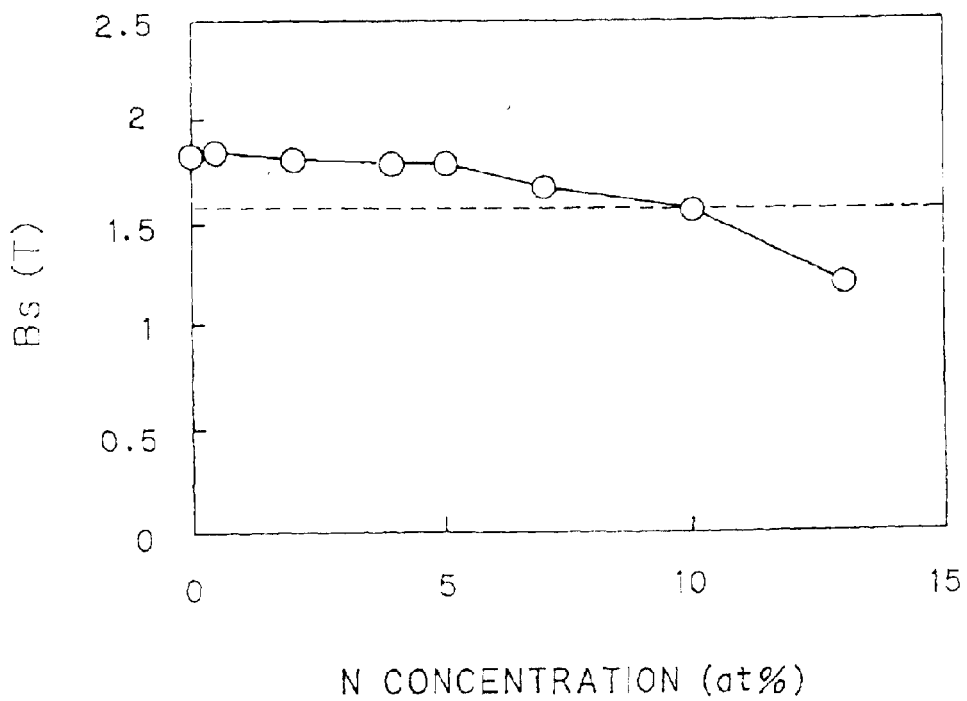
FIG. 13 is a graph showing N-concentration dependence of saturation magnetic flux density $B_s$ of Fe—N—Al—O films.
Figure 14:
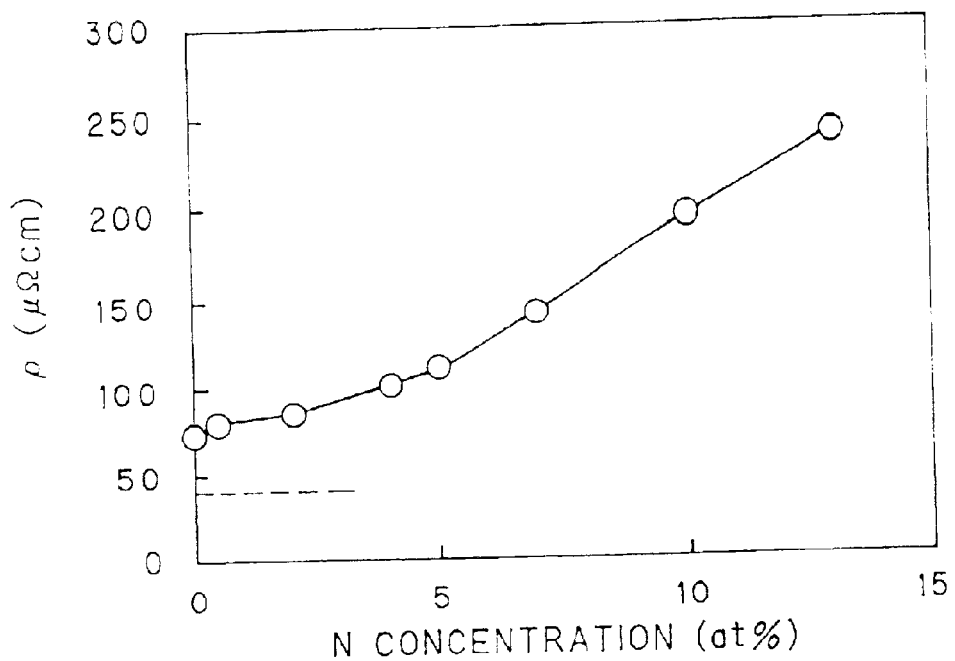
FIG. 14 is a graph showing N-concentration dependence of electric resistivity $\rho$ of Fe—N—Al—O films.
Figure 15:
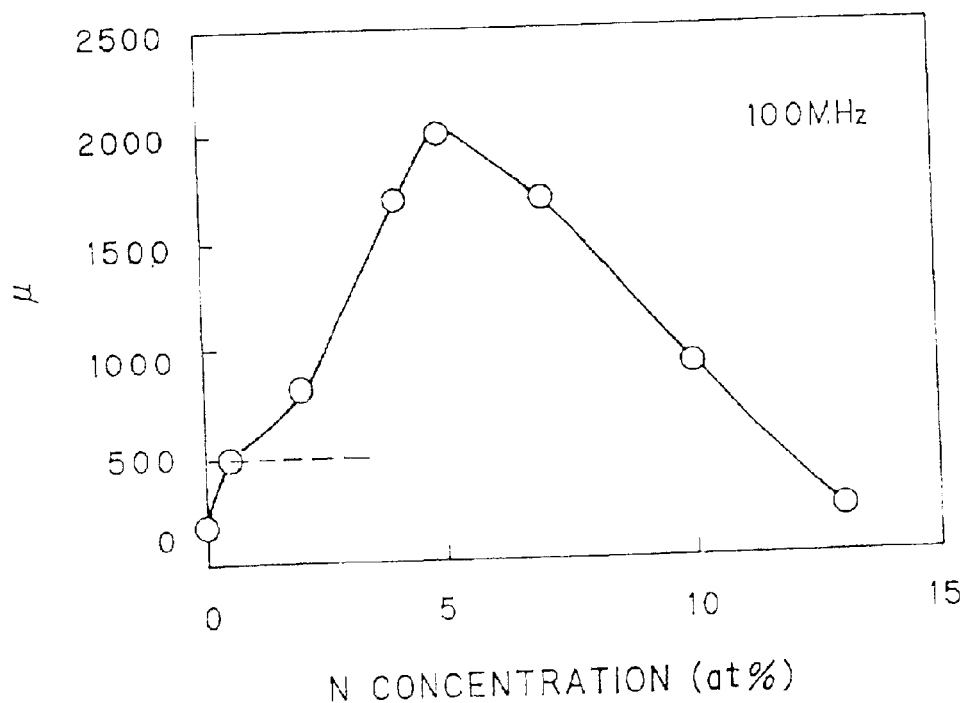
FIG. 15 is a graph showing N-concentration dependence of permeability $\mu$ of Fe—N—Al—O films.

Besides, in FIGS. 13, 14, and 15, Fe—N—Al—O films having N concentrations of from 0 atomic % to 13 atomic % by varying the flow rate of the mixture gas from 0 cm$^3$/s to 10 cm$^3$/s with fixing the number of alumina chips disposed on the target 205 to 30, are measurement targets.

The axis of abscissas of each of FIGS. 10, 11, and 12 represents the Al concentration in the Fe—N—Al—O film by a unit of atomic %, the axis of ordinates of FIG. 10 represents the saturation magnetic flux density $B_s$ of the Fe—N—Al—O film, the axis of ordinates of FIG. 11 represents the electric resistivity $\rho$ of the Fe—N—Al—O film, and the axis of ordinates of FIG. 12 represents the permeability $\mu$ of the Fe—N—Al—O film in a 100 MHz alternating magnetic field. Also, the axis of abscissas of each of FIGS. 13, 14, and 15 represents the N concentration in the Fe—N—Al—O film by a unit of atomic %, the axis of ordinates of FIG. 13 represents the saturation magnetic flux density $B_s$ of the Fe—N—Al—O film, the axis of ordinates of FIG. 14 represents the electric resistivity $\rho$ of the Fe—N—Al—O film, and the axis of ordinates of FIG. 15 represents the permeability $\rho$ of the Fe—N—Al—O film in a 100 MHz alternating magnetic field. In any figure, a white circle indicates a measurement result actually measured and a solid line indicates a result in which these measurement values have been interpolated.

Here, before explanation of the contents of these figures, the magnitudes of saturation magnetic flux density $B_s$, electric resistivity $\rho$, and permeability $\mu$ required for the magnetic pole material of the recording head will be described.

Currently, as the materials usually used for magnetic poles of recording heads, permalloys ($Ni_{80}Fe_{20}$, $Ni_{50}Fe_{50}$) by plating, or the like, are mainstream, and in the future, plating films made of, e.g., CoNiFe whose saturation magnetic flux density $B_s$ is high are thought as candidates of the magnetic pole materials. The values of saturation magnetic flux density $B_s$ and electric resistivity $\rho$ of these plating films are shown in Table 1.

TABLE 1

|  | $B_S$ (T) | $\rho$ ($\mu\Omega$cm) |
| --- | --- | --- |
| $Ni_{80}Fe_{20}$ | ~1 | ~24 |
| $Ni_{50}Fe_{50}$ | ~1.6 | ~48 |
| CoNiFe | ~2 | ~20 |

As shown in Table 1, the $Ni_{50}Fe_{50}$ plating film has a saturation magnetic flux density $B_s$ of 1.6 T at the maximum and the CoNiFe plating film has a saturation magnetic flux density $B_s$ of 2 T at the maximum. But, for the magnetic pole material, not only saturation magnetic flux density $B_s$, electric resistivity $\rho$, and permeability $\mu$ but also magnetostriction, thermal stability, corrosion resistance, internal stress, and so on, must be considered. As for a plating film made of CoNiFe, although the saturation magnetic flux density $B_s$ is high as 2 T, the electric resistivity $\rho$ is low as about 20 $\mu\Omega$cm and further, since the internal stress is high and peeling off the substrate occurs, plating can be done only by about submicron (several thousands Å) and there is a large restriction in application to a magnetic pole. Besides, as for a plating film made of $Ni_{50}Fe_{50}$, although the electric resistivity $\rho$ is about 40 $\mu\Omega$cm, the saturation magnetic flux density $B_s$ is 1.6 T or less and further the magnetostriction constant exhibits a large value of $10^{-5}$ order.

From these circumstances, in a sputter film, it is required to have a saturation magnetic flux density $B_s$ of 1.6 T or more and an electric resistivity $\rho$ of 30 $\mu\Omega$cm or more, exceeding the characteristics of these films.

Note that, since permeability $\mu$ is a quantity that largely changes under an influence by a demagnetizing field in accordance with shape of magnetic film and also depends on frequency, it is the present state that regulating this permeability $\mu$ at material level is hard. Actually, in a magnetic pole made of an $Ni_{80}Fe_{20}$ plating film of a size of about scores $\mu$m after a fine process, it is presumed that the permeability $\mu$ in a high-frequency magnetic field of several hundreds MHz is about 100. Here, as the value of permeability $\mu$ required for magnetic material, a value of 500 or more in a 100 MHz alternating magnetic field in case that the magnetic material is sheet-like, currently generally required, is fixed as an aim. In FIGS. 10 to 15, these saturation magnetic flux density $B_s$ of 1.6 T, electric resistivity $\rho$ of 30 $\mu\Omega$cm, and permeability $\mu$ of a value of 500 are shown by broken lines.

We return to the explanation of FIGS. 10 to 15. As shown in FIG. 10, the saturation magnetic flux density $B_s$ of the Fe—N—Al—O films formed on the substrate 204 was high as 2.1 T when the Al concentration in the film was 0 atomic %, monotonously decreased as the Al concentration in the film increased, reached 1.6 T when the Al concentration in the film was 15 atomic %, and decreased down to 1.3 T at 18 atomic %. Such a decrease in saturation magnetic flux density $B_s$ attendant upon the increase in Al concentration can be explained by a decrease in Fe concentration attendant upon the increase in Al concentration and an increase in O concentration in the film. For this film having a saturation magnetic flux density $B_s$ of 1.6 T or more as described above, it suffices that the Al concentration in the film is 15 atomic % or less.

Besides, as shown in FIG. 11, the electric resistivity $\rho$ of the Fe—N—Al—O films formed on the substrate 204 was low as 28 $\mu\Omega$cm when the Al concentration in the film was 0 atomic %, but monotonously increased as the Al concentration in the film increased, exceeded 30 $\mu\Omega$cm when the Al concentration in the film was 1 atomic %, exceeded 50 $\mu\Omega$cm at 3 atomic %, exceeded 100 $\mu\Omega$cm at 8 atomic %, and reached about 500 $\mu\Omega$cm at 15 atomic %. It is thought that such an increase in electric resistivity $\rho$ attendant upon the increase in Al concentration is caused by an increase in electric resistivity of a crystal particle itself due to increases in Al concentration and O concentration of Al and O solid-solved in the crystal particle whose main component is Fe, in the film, and this film exhibited a high electric resistivity $\rho$ even if it did not have a structure of an organization in which the crystal particle of Fe was surrounded by alumina like a conventional Fe—N—Al—O film. For this film having an electric resistivity $\rho$ of 30 $\mu\Omega$cm or more, it suffices that the Al concentration in the film is 1 atomic % or more.

Besides, as shown in FIG. 12, the value of permeability $\mu$ of the Fe—N—Al—O films formed on the substrate 204 was low as 150 when the Al concentration in the film was 0 atomic %, but monotonously increased as the Al concentration in the film increased, already exceeded 500 when the Al concentration in the film was 1 atomic %, and took the maximum value exceeding 2000 at 5 atomic %. It is thought that such an increase in permeability $\mu$ is caused by that the growth of a crystal particle of the Fe—N—Al—O film is restrained by solid solution of Al and O into Fe and the effective magnetic anisotropy $H_{eff}$ contributing soft magnetic characteristics decreases, and so on. Besides, the value of permeability $\mu$ of this film monotonously decreased as the Al concentration in the film further increased from 5 atomic %, and lowered to 700 at 18 atomic %. It is thought that such a decrease in permeability $\mu$ is caused by the above-described decrease in saturation magnetic flux density $B_s$ attendant upon the increase in Al concentration. For this film having a permeability $\mu$ of 500 or more, it suffices that the Al concentration in the film is 1 atomic % or more.

As described above, it was found that, for the Fe—N—Al—O film satisfying the above-described required values of saturation magnetic flux density $B_s$, electric resistivity $\rho$, and permeability $\mu$, it suffices that the Al concentration in the film falls within the range not less than 1 atomic % and not more than 15 atomic %.

For examining the ranges of concentrations of Fe, N, and O that were elements other than Al in this film, detailed composition analysis was performed to an Fe—N film and an Fe—N—Al—O film respectively formed when the flow rate of the above mixture gas was 4.5 cm³/s and the number of alumina chips as described above was 0 and 30. As a result of the composition analysis, the composition of the Fe—N film was $Fe_{97}N_3$ (atomic %) and the composition of the Fe—N—Al—O film was $Fe_{78}N_4Al_8O_{10}$ (atomic %). As known from the compositions of these two kinds of films, there is a tendency that as the Al concentration in the film increases, the N concentration in the film also increases. Besides, in the result of this composition analysis, the concentrations of light elements of O and N were concentrations 1.25 times the Al concentration. But, it is hard to accurately examine this O concentration by composition analysis, and it is thinkable that these O and N concentrations contain somewhat large errors. Newly, when detailed composition analysis was performed to an Fe—Al—O film formed when the flow rate of the above mixture gas was 0 cm³/s and the number of alumina chips as described above was 30, the composition of the Fe—Al—O film was $Fe_{83}Al_6O_{11}$ (atomic %) and the O concentration was the concentration about 1.8 times the Al concentration.

On the basis of these results, the composition of the Fe—N—Al—O film in case that the Al concentration fell within the range of 1 atomic % to 15 atomic %, was estimated. First, from the above tendency, the N concentration in this film was calculated by making linear interpolation and linear extrapolation so that the N concentrations of the above two kinds of films may be 3 atomic % and 4 atomic % in the respective cases of Al concentrations of 0 atomic % and 8 atomic %. Besides, as for the 0 concentration in this film, from the result of the above composition analysis, taking the average, it was calculated to be the concentration 1.5 times the Al concentration. In this way, a result was obtained in which the composition of the Fe—N—Al—O film having the Al concentration of the above 1 atomic % was $Fe_{94.5}N_3Al_1O_{1.5}$ (atomic %) and the composition of the Fe—N—Al—O film having the Al concentration of the above 15 atomic % was $Fe_{57.5}N_5Al_{15}O_{22.5}$ (atomic %). From this result, for the Fe—N—Al—O film satisfying the above-described required value saturation magnetic flux density $B_s$, electric resistivity $\rho$, and permeability $\mu$ it suffices that, in addition to that the Al concentration in the film falls within the range not less than 1 atomic % and not more than 15 atomic %, the Fe concentration falls within the range not less than 57.5 atomic % and not more than 94.5 atomic % and the O concentration falls within the range not less than 1.5 atomic % and not more than 22.5 atomic %. Note that, in these measurement results shown in FIGS. 10 to 12, the Al concentration was changed and the N concentration in the Fe—N—Al—O film changes not so much. The range that the N concentration must satisfy is determined on the basis of the results of FIGS. 13 to 15 showing measurement results concerning samples in which the N concentration of the film was changed by controlling the flow rate of the above mixture gas.

The measurement results shown in FIGS. 13 to 15 will be described. As shown in FIG. 13, the saturation magnetic flux density $B_s$ of the Fe—N—Al—O films formed on the substrate 204 was high as 1.8 T when the N concentration in the film was 0 atomic %, monotonously decreased as the N concentration in the film increased, reached 1.6 T when the N concentration in the film was 10 atomic %, and decreased down to 1.2 T at 13 atomic %. It is thinkable such a decrease in saturation magnetic flux density $B_s$ attendant upon the increase in N concentration is caused by a decrease in Fe concentration attendant upon the increase in N concentration in the film and a change in solid solution state of N atoms in an Fe lattice. For this film having a saturation magnetic flux density $B_s$ of 1.6 T or more as described above, it suffices that the N concentration in the film is 10 atomic % or less.

Besides, as shown in FIG. 14, the electric resistivity $\rho$ of the Fe—N—Al—O films formed on the substrate 204 already reached 75 $\mu\Omega$cm when the N concentration in the film was 0 atomic %, monotonously increased as the N concentration in the film increased, reached 200 $\mu\Omega$cm when the N concentration in the film was 10 atomic %, and reached 230 $\mu\Omega$cm at 13 atomic %. It is thought that such an increase in electric resistivity $\rho$ attendant upon the increase in N concentration is caused by an increase in electric resistivity of a crystal particle itself due to an increase in N concentration of N solid-solved in the crystal particle whose main component is Fe, in the film. It is found that this film has an electric resistivity $\rho$ of 30 $\mu\Omega$cm or more at all N concentrations.

Besides, as shown in FIG. 15, the value of permeability $\mu$ formed on the substrate 204 was low as 200 when the N concentration in the film was 0 atomic %, but monotonously increased as the N concentration in the film increased, exceeded 500 when the N concentration in the film was 0.5 atomic %, and took the maximum value exceeding 2000 at 5 atomic %. Besides, the value of permeability $\mu$ of this film monotonously decreased as the N concentration in the film further increased from 5 atomic %, lowered to 500 at 12 atomic %, and lowered to 200 at 13 atomic %. Such a change in permeability $\mu$ is similar to the change in permeability $\mu$ shown in FIG. 12 and here, N performs the roles of Al and O in the behavior of the permeability of FIG. 12. For this film having a permeability $\mu$ of 500 or more, it suffices that the N concentration in the film is not less than 0.5 atomic % and not more than 10 atomic %.

As described above, it was found that, for the Fe—N—Al—O film satisfying the above-described required values of saturation magnetic flux density $B_s$, electric resistivity $\rho$, and permeability $\mu$, it suffices that the N concentration in the film falls within the range not less than 0.5 atomic % and not more than 10 atomic %. Incidentally, when the range of the Fe concentration in the film in case that the N concentration in the film falls within this range was calculated similarly to the above-described range of the Fe concentration, it was the range of 62.5 atomic % to 82.5 atomic %, which was involved in the above-described range of the Fe concentration.

Putting in order, from the above results, for the Fe—N—Al—O film satisfying the above-described required values of saturation magnetic flux density $B_s$, electric resistivity $\rho$, and permeability $\mu$, it suffices that the Fe concentration in the film falls within the range not less than 57.5 atomic % and not more than 94.5 atomic %, the N concentration in the film falls within the range not less than 0.5 atomic % and not more than 10 atomic %, the Al concentration in the film falls within the range not less than 1 atomic % and not more than 15 atomic %, and further the O concentration in the film falls within the range not less than 1.5 atomic % and not more than 22.5 atomic %.

The Fe—N—Al—O film from which the above TEM image was photographed had a composition of the above $Fe_{78}N_4Al_8O_{10}$ (atomic %) and exhibited desirable characteristics in which the saturation magnetic flux density $B_s$ was 1.8 T. $\rho$ was 110 $\mu\Omega$cm, and the permeability $\mu$ was 1800. The mean particle diameter of crystal particles of this film was small as 5 nm or less. It is thought that these desirable characteristics, at least the characteristic of the permeability $\mu$ is due to this smallness of the mean particle diameter, and the mean particle diameter of crystal particles of the Fe—N—Al—O film is preferably 5 nm or less.

<Multilayer Film>

Besides, multilayer films in which Fe—N—Al—O films satisfying the above-described required values and non-magnetic substances or magnetic substances were alternately laminated were made and the soft magnetic characteristics were examined.

TABLE 2

| Thickness of Fe—N—Al—O layer (Å) | Kind of intermediate layer | Thickness of intermediate layer (Å) | Number of laminated layers |
|---|---|---|---|
| 1000 | Al$_2$O$_3$ | 10 | 20 |
| 1000 | SiO$_2$ | 10 | 20 |
| 1000 | Fe—N | 200 | 20 |
| 1000 | Fe—Zr—N | 200 | 20 |
| 1000 | Fe—Ni | 200 | 20 |
| 1000 | Co—Fe—Ni | 200 | 20 |

Table 2 shows the thickness of Fe—N—Al—O layer constituting the multilayer film, the kind and thickness of intermediate layer also constituting the multilayer film, and further the number of laminated intermediate layers. This multilayer film is a multilayer film in which 20 Fe—N—Al—O layers having a thickness of 1000 Å and 20 intermediate layers made of any one material selected out of Al$_2$O$_3$, SiO$_2$, Fe—N, Fe—Zr—N, Fe—Ni, and Co—Fe—Ni, are laminated. The thickness of the intermediate layer made of an insulating material, i.e., Al$_2$O$_3$or SiO$_2$, was 10 Åand the thickness of the intermediate layer made of a magnetic material, i.e., Fe—N, Fe—Zr—N, Fe—Ni, or Co—Fe—Ni, was 200 Å. Incidentally, the Fe—N—Al—O film used for the lamination has characteristics of $B_s$=1.8 T, $\rho$=110 $\mu\Omega$cm, and $\mu$=1800.

In case that the intermediate layer is made of the insulating material, the permeability $\mu$ somewhat increases in comparison with an Fe—N—Al—O single-layer film, to about 2000, and it exhibits good frequency characteristics. As for this, it is thought that a result of magnetostatic coupling between Fe—N—Al—O layers through the intermediate layer and a reduction of eddy current loss due to the insertion of the insulating intermediate layer participate. Besides, in this film, since the thickness of the insulating intermediate layer is thin as 10 Å, the saturation magnetic flux density $B_s$ is substantially the same as that of the Fe—N—Al—O single-layer film.

In case that the intermediate layer is made of the magnetic material, although being influenced by magnetic characteristics of the magnetic material constituting the intermediate layer, a result that the permeability R exhibited a high value exceeding 1000 was obtained, and there appeared an improvement of frequency characteristics in comparison with a single-layer film of Fe—N, Fe—Zr—N, Fe—Ni, or Co—Fe—Ni having a low resistivity (30 $\mu\Omega$cm or less). It is thought that this improvement is because an eddy current was restrained by the Fe—N—Al—O layer of a high resistance (110 $\mu\Omega$cm) constituting the multilayer film. From this result, it is found that the Fe—N—Al—O film is applicable not only to a magnetic pole of the Fe—N—Al—O single layer but also to a composite magnetic pole by a combination with a different kind of magnetic material. Incidentally, although the value of saturation magnetic flux density $B_s$ of this multilayer film depends upon the saturation magnetic flux density $B_s$ of the magnetic film constituting the intermediate layer and varies, when only the saturation magnetic flux density $B_s$ of the Fe—N—Al—O film constituting the multilayer film was calculated, the saturation magnetic flux density $B_s$ took substantially the same value as that of the above-described Fe—N—Al—O single-layer film, i.e., 1.8 T.

Also in case of using oxide or nitride constituted by one or more elements selected from the element group of Al, B, Ga, Sl, Ge, Y, Tl, Zr, Hf, V, Nb, Ta, Cr, Mo, W and Rh, in place of $Al_2O_3$ used as the constituent substance of the target 205, as described above, as for a single-layer film and a multilayer film containing one or more elements selected from the element group, in the organization, magnetic characteristics such as saturation magnetic flux density $B_s$ and permeability $\mu$, and electric characteristics such as electric resistivity $\rho$, similar results to the single-layer film of the above Fe—N—Al—O film and the multilayer film including the above Fe—N—Al—O film were obtained.

The film mentioned in this example, satisfying the above-described required values of saturation magnetic flux density $B_s$, electric resistivity $\rho$, and permeability $\mu$, and made up of Fe, O, N, and one or more elements selected from the above element group, is a soft magnetic film provided with a high saturation magnetic flux density $B_s$, a high electric resistivity $\rho$, and a high permeability $\mu$ immediately after the formation at a low temperature, and is suitable for a magnetic material of a recording head performing recording at a high recording frequency.

What is claimed is:

1. A magnetic thin film, characterized by being a polycrystalline film comprising:

Fe whose content is not less than 57.5 atomic % and not more than 94.5 atomic %;

one or more kinds of elements M selected from the element group of Al, B, Ga, Si, Ge, Y, Ti, Zr, Hf, V, Nb, Ta, Cr, Mo, W and Rh, wherein the total content of the M elements is not less than 1 atomic % and not more than 15 atomic %;

N whose content is not less than 0.5 atomic % and not more than 10 atomic %; and O whose content is not less than 1.5 atomic % and not more than 22.5 atomic %, wherein N, M and O are solid-solved in a crystal phase of which main component is Fe.

2. The magnetic thin film according to claim 1, which is a polycrystalline film made up of crystal particles whose mean particle diameter is not more than 15 nm.

3. The magnetic thin film according to claim 1, wherein a saturation magnetic flux density is not less than 1.6 T and an electric resistivity is not less than 30 $\mu\Omega$cm.

4. A recording head which has a coil generating a predetermined magnetic field and a soft magnetic member magnetized by the magnetic field generated from the coil and which magnetizes an external medium by the magnetic field generated by the coil and transmitted by the soft magnetic member, characterized in that said soft magnetic member is a polycrystalline film comprising:

Fe whose content is not less than 57.5 atomic % and not more than 94.5 atomic %;

one or more kinds of elements M selected from the element group of Al, B, Ga, Si, Ge, Y, Ti, Zr, Hf, V, Nb, Ta, Cr, Mo, W and Rh, wherein the total content of the elements is not less than 1.0 atomic % and not more than 15 atomic %;

N whose content is not less than 0.5 atomic % and not more than 10 atomic %; and O whose content is not less than 1.5 atomic % and not more than 22.5 atomic %, wherein said soft magnetic member is a magnetic thin flu in which N, M and O are solid-solved in a crystal phase of which main component is Fe.

5. The recording head according to claim 4, wherein said soft magnetic member is a polycrystalline film made up of crystal particles whose mean particle diameter is not more than 15 nm.

6. The recording head according to claim 4, wherein said soft magnetic member has a saturation magnetic flux density of not less than 1.6 T and an electric resistivity of not less than 30 $\mu\Omega$cm.

7. The magnetic thin film according to claim 1, which substantially excludes a ceramics phase.

8. The recording head according to claim 4, which substantially excludes a ceramics phase.

* * * * *

UNITED STATES PATENT AND TRADEMARK OFFICE
CERTIFICATE OF CORRECTION

PATENT NO. : 6,822,831 B2
DATED : November 23, 2004
INVENTOR(S) : Ikeda et al.

It is certified that error appears in the above-identified patent and that said Letters Patent is hereby corrected as shown below:

Title page,
Item [56], References Cited, OTHER PUBLICATIONS, please delete "Willaim" and insert -- William --.

Column 18,
Line 35, delete "flu" and insert -- film --.

Signed and Sealed this

Twelfth Day of April, 2005

JON W. DUDAS
*Director of the United States Patent and Trademark Office*